United States Patent [19]

Catlin et al.

[11] 3,956,858

[45] *May 18, 1976

[54] FLEXIBLE HAND HELD ABRADING TOOL

[75] Inventors: Robert T. Catlin, Trumbull; Chester H. Dawson, Danbury; Philip R. Haskell, Easton, all of Conn.

[73] Assignee: Remington Arms Company, Inc., Bridgeport, Conn.

[ * ] Notice: The portion of the term of this patent subsequent to Nov. 27, 1990, has been disclaimed.

[22] Filed: Jan. 23, 1975

[21] Appl. No.: 543,347

Related U.S. Application Data

[63] Continuation-in-part of Ser. No. 418,498, Nov. 23, 1973, Pat. No. 3,874,126, which is a continuation-in-part of Ser. No. 189,786, Oct. 15, 1971, Pat. No. 3,774,355, which is a continuation of Ser. No. 803,561, March 3, 1969, abandoned.

[52] U.S. Cl. .................................. 51/393; 29/80; 51/205 R; 51/394
[51] Int. Cl.² .................. B24D 15/02; B24D 11/00
[58] Field of Search .............. 51/205 R, 392–407, 51/308, 309; 30/166; 29/95 A, 95 C, 80; 76/112; 145/61 C, 61 K, 108 R; 125/16, 18

[56] References Cited
UNITED STATES PATENTS

| | | | |
|---|---|---|---|
| 1,529,472 | 3/1925 | Falos | 29/80 |
| 2,662,569 | 12/1953 | Swalinkauich | 145/108 R |
| 2,906,612 | 9/1959 | Anthony | 76/112 |
| 3,553,905 | 1/1971 | Lemelson | 51/309 |
| 3,630,699 | 12/1971 | Catlin | 76/112 X |
| 3,716,433 | 2/1973 | Plummer | 145/61 R |
| 3,751,283 | 8/1973 | Dawson | 51/309 |
| 3,770,033 | 11/1973 | Gavillet et al. | 145/61 C |

*Primary Examiner*—Al Lawrence Smith
*Assistant Examiner*—Nicholas P. Godici
*Attorney, Agent, or Firm*—John H. Lewis, Jr.; Nicholas Skovran; William L. Ericson

[57] ABSTRACT

A flexible base metal strip has a strong, tough and adherent abrasive armoring coating produced thereon in situ from abrasive particles of hard, high melting material selected from the group consisting of metal carbides, borides, nitrides, silicides and combinations thereof, and particles of a matrix metal, said matrix metal particles being in said armoring coating and fusion bonded to each other, to the base metal strip and to the abrasive particles to anchor and partially embed the abrasive particles therein with the particles projecting therefrom in the form of a series of sharp cutting edges. When such a strip is provided at one end with a suitable handle, it forms a convenient hand file and its flexibility permits use in a variety of situations. Attachment means may be provided at each end of the coated strip as shown in a co-pending application for attachment of the strip to a suitable frame such as a standard hack saw frame. When properly secured and tensioned in such a frame, a small, flexible hand held abrading tool is formed which is suitable for hand working materials having such a high hardness as to be unsuitable to be worked by prior art abrading tools.

2 Claims, 5 Drawing Figures

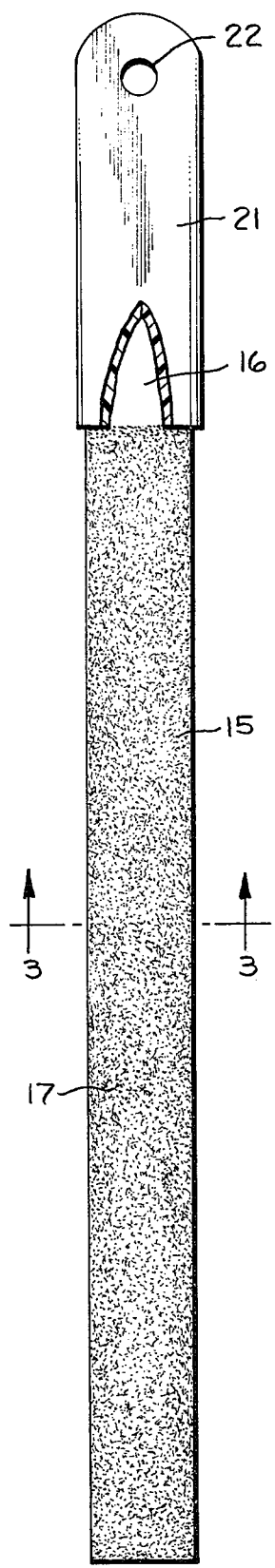
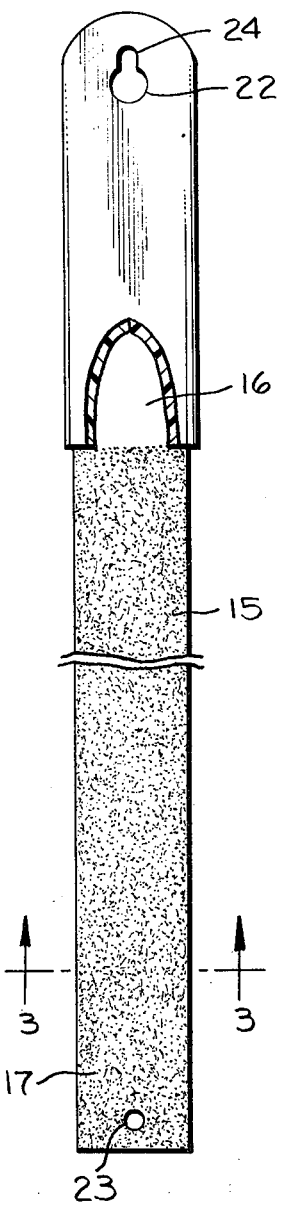
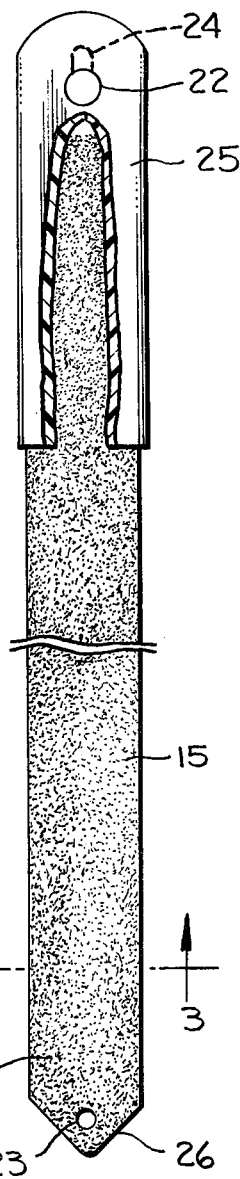
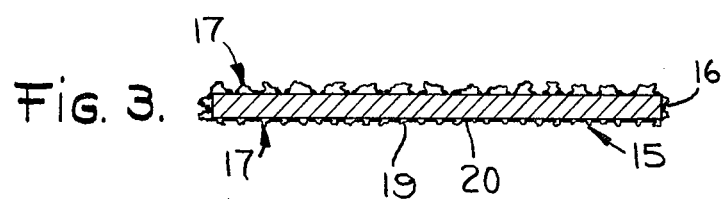
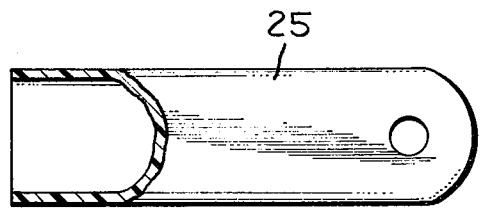

FLEXIBLE HAND HELD ABRADING TOOL

This is a continuation-in-part of our co-pending application Ser. No. 418,498, filed Nov. 23, 1973, which is now U.S. Pat. No. 3,874,126 and which is a continuation-in-part of our application Ser. No. 189,786, filed Oct. 15, 1971, now U.S. Pat. No. 3,774,355, which is in turn a continuation of our application Ser. No. 803,561, filed Mar. 3, 1969, now abandoned.

This invention pertains to armored abrading tools comprising a structural base member composed of a base metal, such as steel, alloy steel or other metal or alloy characterized inherently by high strength, hardness and toughness or heat treatable to such, said structural base member having a hard wearing, ductile and abrasive surface coating produced in situ from powdered metal particles of a hard, refractory brazing or matrix metal or metal alloy, such as a nickel-base or cobalt-base alloy, and abrasive particles of a hard, high melting material, such as metal carbides, borides, nitrides, silicides or equivalent diamond substitute materials, said matrix metal particles being fusion bonded to each other, to said abrasive particles and to said base metal, and said abrasive particles being partially embedded or anchored in said matrix metal and projecting therefrom to provide a multiplicity of sharp cutting edges.

The invention provides a new tool of the above type and methods of producing the same. These tools have a new field of utility, namely, a flexible, hand held file band tool having surface portions armored as above, the tool being particularly adapted for hand filing and surface abrading of such refractory materials and metals as glass, fiber glass, ceramics, cement asbestos, tiles, high temperature alloys, such as chrome-nickel alloys, titanium and titanium base alloys and the like.

Small hand held filing or abrading tools have long been commercially available. The most common tool of this type is characterized by the conventional metal file which generally comprises a relatively thick piece of suitably shaped steel with its surfaces grooved in a pattern to produce raised cutting points for effecting the abrading or filing action. Similar tools have recently been manufactured by securing minute cutting elements to the steel bar by a copper braze instead of scoring the surface. Such tools are disclosed in U.S. Pat. No. 2,906,612, issued to Myron L. Anthony et al on Sept. 29, 1959. Prior art hand held abrading devices may be used only for surface grinding of relatively soft materials, such as wood or other cellulosic products, unreinforced plastics, relatively soft metals such as aluminum, brass, mild steel and the like. Additionally, they are inherently rigid, rendering them much less readily adaptable to work in the contouring of surfaces.

In accordance with this invention, a section of a flexible file band may be provided at one end with a handle or gripping surface and used as a flexible file which may be conformed to odd shapes or fitted into confined spaces. Also, such a band of suitable length may be mounted at its end portions to an appropriate frame, such as a hack saw frame. Tension of the file band may thus be adjusted to provide any desired degree of flexibility for abrading work.

The armoring coating of the file band is preferably so applied that the abrading grit particles are anchored in weldments of the matrix metal which are individual thereto and which may be spaced apart as desired for enhancing the flexibility and fatigue life of the file band. A preferred method for applying the armoring coating to the substrate band stock consists first in precoating the abrasive particles with a fluxing agent, such as borax, and with the brazing metal powders, the brazing metal powders being advantageously of much smaller particle size than the abrasive particles as described in U.S. Pat. No. 3,774,355. A thin adhesive coating is next applied to the surface portion or portions of the substrate to be armored, preferably by a printing operation, employing a thin alcoholic solution of shellac or other adhesives as the coating materials. Before this coating becomes dry, the so-printed surface of the substrate is passed beneath a falling curtain of the precoated abrasive particles at a rate of application adjusted to provide a preselected average spacing between the particles falling upon and adhering to the printed surface portions, non-adhering particles being removed thence by such means as turning the strip upside down or by exposing it to an air blast or vacuum nozzle. With the coated strip again turned right side up, the coated surface is passed through a falling curtain of "Oxweld Brazo Flux" or other suitable brazing flux such as the commercially available compositions of borax and/or boric acid which will adhere to the still tacky adhesive coating. The coated blank is then allowed to dry, with or without the slight application of heat, and then turned over for coating on the reverse side, after which it is again dried. If the adhesive is applied to the edges of the strip and the strip held at about a 45° angle while being passed through the falling curtain of precoated abrasives, the edges will also become coated with abrasive so that the strip may function as a saw as well as functioning as a file. In this way, the precoated abrasive particles may be applied to the printed surface portions in as dense or sparse a distribution as desired, depending on the character of the substrate being armored. For armoring the file band stock of this invention, a relatively sparse distribution is desired as has been previously mentioned.

The thus coated and dried tool or substrate strip stock is then passed through an induction heating coil energized from a high-frequency alternating current source for rapidly heating the tool of file band stock to temperatures sufficiently high to melt the brazing metal powders coating each grit particle whereby the molten matrix metal flows about the base of each grit particle and onto the base metal substrate and by capillary action coalesces into a cup-like molten pool partially immersing the grit particle therein, with said particle projecting therefrom. A practicable method is to place the coated strip on a pallet of electrically and thermally insulating material such as "Transite" asbestos composition, or a dielectric ceramic to which the carbide will not adhere, and traverse both pallet and strip stock through the coil.

The file band stock is next subjected to rapid cooling in an inert atmosphere or fluid until cooled to temperatures such that the molten cusp of brazing metal surrounding the base of each grit particle solidifies and thus permanently anchors the grit base therein in bonded relation to the grit particle and to the substrate base metal. This heating and cooling may also be such as to austenitize and thence transform to martensite the micro-structure of this steel substrate, which is thereafter subjected to a tempering treatment.

The file band may be made up in individual pieces, or in multiples, or continuous lengths and then cut into suitable lengths for use in the desired manner and provided with a suitable handle or punched to provide mounting holes for use in a saw frame. If made in continuous lengths, the band should preferably be prepunched in a manner analogous to that disclosed in U.S. Pat. No. 3,630,699 to R. T. Catlin.

Numerous advantages result from individually precoating the grit particles, each with its own supply of brazing metal and fluxing agent. The amount of brazing metal for each grit particle can be accurately controlled to partially embed the same only to an extent desired and to assure that each grit particle will project therefrom to provide a sharp, exposed cutting edge. The brazing metal for each grit particle bonds only to the grit particle coated thereby and also only to a relatively small area of the substrate base metal. This is a particular advantage in armoring applications requiring a flexible substrate with optimum fatigue properties as in the file band of this invention. This is further facilitated by the fact that the precoated grit particles may be applied to the substrate with a controlled average spacing between the particles such that the bonded particles may be spaced apart sufficiently as not to impair the flexibility and fatigue life of the substrate band stock. The precoating also facilitates application of the armoring coating in spaced patterns is such is desired for a particular application. The precoating of the grit particles is particularly efficacious where such particles are relatively large. Small grit particles are, however, more difficult to precoat and, with respect to such, a satisfactory file band can be produced without precoating.

In an alternative coating process, the strip stock may be coated with a thin alcoholic solution of shellac or with some similarly adhesive material and passed through a falling curtain of particles of a refractory brazing alloy such as a nickel base or cobalt base alloy to deposit on the strip a thin layer, essentially only one particle thick, of the brazing alloy. The coated strip may then be made adhesive by spraying lightly with alcohol, which by capillarity will bring shellac to the surface, or by spraying with a thin alcoholic solution of shellac, and passed through a falling curtain of particles of the hard abrasive materials such as tungsten carbide grit to produce a layer of spaced carbide grits on the surface of the layer of brazing alloy. Before the coating has dried sufficiently to lose its adhesive characteristics, the strip is passed through a falling curtain of "Oxweld Brazo Flux" or similar commercially available brazing flux such as those composed primarily of borax and/or boric acid.

After applying each layer of the composite coating, the strip is turned over to remove any loosely adherent material, and after all three coatings have been applied to one side surface and one edge, the strip is dried. The coating process may then be repeated for the other surface and the other edge, and after again drying, the strip may be passed through an induction generator coil to fuse the brazing alloy as above described.

Having thus described the invention in general terms, reference will now be had for a more detailed description to the accompanying drawings, wherein:

FIG. 1 is a plan view of a hand-held abrading tool constructed by dipping one end of a short section of a heated file band of this invention into liquid polyvinyl chloride resin compound bath to provide a handle;

FIG. 2 is a view similar to FIG. 1 with holes formed near each end of the strip to permit mounting in a conventional hack saw frame as described in application Ser. No. 418,498 referred to above;

FIG. 3 is an enlarged sectional view of FIG. 1 and/or FIG. 2 taken along the line 3—3 thereof to show that both surfaces are coated with grit of different granulation;

FIG. 4 is a plan view similar to FIGS. 1 and 2 wherein a different handle embodiment is utilized and one end is formed to facilitate use in corners; and FIG. 5 is a plan view, partially in section, showing the handle utilized in FIG. 4.

Referring now to the drawings, FIG. 1 illustrates an abrading tool in accordance with this invention. In this embodiment, the file band 15 is provided with a handle 21 formed by dipping the end of the file band heated to about 400°F. into a bath of a liquid composition comprising a polyvinyl chloride resin dispersed in a suitable liquid plasticizer. This material is converted to an elastomeric solid coating when heated to a temperature between 350° and 400°F., with the thickness of the coating determined by the temperature to which the file band has been heated and the heat storage capacity of the band. One suitable coating is a "Low Fusion Plastisol Compound" No. 2814, Type II produced by the G. S. & Plastics Co., a division of Custom Trim Products Inc., 5201 Grant Avenue, Cleveland, Ohio 44125.

The file band 15 preferably comprises a flexible strip of base metal, such as a steel or alloy steel strip 16, which is provided with an armoring coating 17 extending continuously in the longitudinal direction. One end portion, however, may remain uncoated in a manner and for reasons to be further described in detail. As described and illustrated in the co-pending application Ser. No. 418,498, the armoring coating 17 comprises a myriad of tungsten carbide or other diamond-substitute abrasive particles 19, each of said particles being partially embedded in and bonded to a substantially meniscus-shaped anchoring layer 20 of a matrix metal, such as a high melting, refractory, nickel-base or cobalt-base alloy, which anchoring layer of matrix metal is in turn bonded to and alloyed with the base metal 16. The particles 19 are preferably bonded to the edges as well as the major surfaces of the file band 15, so that it may be used as a saw as well as a file.

As stated in the co-pending application above referred to, the preferred material applied to the steel or alloy steel base metal band stock for purposes of armoring comprises tungsten carbide particles precoated with a suitable flux, such as borax, and also with the brazing metal powders. The materials employed for the brazing metal are preferably powders of hard, refractory alloys, such as nickel-base or cobalt-base alloys, capable of providing a matrix metal which wets the surfaces of and bonds to the tungsten carbide or other diamond-substitute particles and also which fusion bonds to and alloys with the steel or alloy steel base metal band stock. Suitable such brazing alloys are "Stellite" No. 1 a cobalt-chromium tungsten alloy of well-known composition; or the alloy identified as "AMS 4777" and which is sold by the Wall Colomony Corporation; an Aerospace Material specification of ASTM Spec. B-260-BNi2 sold as "LM Nicrobraz" comprising an alloy consisting of 13.5% Cr, 3.5% B, 4.5% Si, 2.5% Fe, and the balance nickel. A suitable particle size for the brazing metal powders is −300 mesh. A suitable particle size for the carbide particles for a relatively coarse file is that which passes through a 50 mesh screen but is held on a 70 mesh screen. Thus, the particle size of the carbide particles is considerably greater than for the brazing metal powders. For a relatively fine file, a suitable abrasive is that which passes through a 100 mesh screen but is held on a 140 mesh screen. As shown in FIG. 3, the band may be coated on both sides with a fine coating on one side and a coarse coating on the other side. The coating is preferably continuous over the working length of the file band strip although it may be separated into discrete patterned areas as in the case of the continuous band file shown in U.S. Pat. No. 3,774,355 above referred to.

For reasons of economy, it is desirable not to carry the abrasive coating into the area which is to be covered by the vinyl dip handle. As noted above, a polyvinyl chloride resin such as that known as "Plastisol" forms a very convenient elastomeric handle. Such a handle may be applied by first cleaning the portion to which the handle is to be applied by the use of suitable solvents for oil and grease or by grit blasting or other suitable means. A primer of the type recommended by the manufacturer of "Plastisol" coatings may be applied and allowed to air dry for 3 to 5 minutes. At least all of that portion of the file band strip which is to be covered with the handle is heated to about 400° F. and immersed in the "Plastisol" liquid. As the heated metal raises the temperature of the "Plastisol" liquid into the temperature range of 350° to 400° F., the resin solidifies to an elastomeric solid coating. The thickness of the elastomeric coating is dependent upon the temperature of the immersed metal, its heat storage capacity, and the length of time of the immersion. Obviously, the greatest thickness will be attained by leaving the file immersed until it has cooled to below the solidification temperature of the resin. Any excess of liquid should be allowed to drain off as the file is removed from the bath and the elastomeric coating is post-cured at about 375° F. for 10 to 20 minutes.

A hole 22 is provided to facilitate hanging the file from any suitable tool rack.

FIG. 2 shows an embodiment which is essentially the same as that shown in FIG. 1, with the exception that means have been provided to secure the strip under tension in a conventional saw frame as disclosed in the co-pending application Ser. No. 418,498 above referred to. A hole 23 approximately 0.156 inch diameter has been provided in one end of the strip and the ⅜ inch diameter hole 22 for hanging the tool has been modified by the addition of a communicating slot 24 of about 0.156 inch width which terminates with a semicircular end portion of about 0.156 inch diameter. The hole 23 and slot 24 may be engaged on the locating and tensioning pins of a conventional hacksaw or other similar saw frame and the tool may be used as described in the co-pending application.

To assemble an abrading tool in accordance with this embodiment of the invention with a suitable file band 15, a frame is selected of an appropriate size to accommodate the file band or, if adjustable as is the usual hacksaw frame, is adjusted to an appropriate size to accommodate the file band. With the mounting pins oriented in the proper direction, the file band is engaged on the mounting pins and, through the use of a suitable tensioning means, such as a wing nut, the file band is tightened to a tension suitable for the job to be accomplished.

In accordance with this invention, the file band 15 is not supported between its end portions so that it maintains a high degree of flexibility. This is of great advantage in working many of the materials suitable for the abrading tool. When filing metals and other hard materials, portions of the material to be filed may be too hard to be removed by the action of a single abrasive particle 19 (FIG. 3). Were the file band 15 rigid, in the manner of prior art files, the abrasive particles 19 could become rigidly interlocked with portions of the material to be filed, thus causing the abrading tool to split or skip, and producing an excessive amount of wear of the tool. With the flexible file band of this invention, if an abrasive particle 19 is unable to move a portion of material which it abuts, it will be moved, with the file band, away from and over the material so that the abrading tool continues to move smoothly and other abrasive particles 19 can engage the material in a similar manner until it has been successfully removed.

The flexibility of the file band 15, particularly when coupled with the adjustability provided by tensioning means of the usual saw frame, greatly eases the task of shaping materials such as fiber glass and ceramics in that the file band 15 is deformable into a somewhat curved shape to accommodate the curvature of the item being shaped for greater ease and smoothness of filing. Further, the spacings between adjacent abrasive particles, coupled with the flexible nature of the file band, enables the tool to be virtually self-cleaning. This prevents the clogging which has been known to generally disable prior art abrading devices.

The versatility of the invention is further enhanced by the embodiment shown in FIG. 4. In this embodiment, the abrasive coating is continuous for nearly the full length of both sides of the strip, and again a mounting hole 23 and mounting slot 24 have been provided to facilitate mounting the file band 15 under tension in a conventional saw frame. With a full length abrasive coating, substantially the full length of the strip can be utilized for filing when the strip is mounted in a hacksaw frame as in the co-pending application.

In this embodiment, a detachable handle 25 is molded of any suitable elastomeric material and slipped over the end of the file strip when it is desirable to use the tool as a flexible hand file. Such a handle is separately shown in FIG. 5.

FIG. 4 also illustrates a pointed or tapered end 26 of the file strip which adapts the tool for hand filing in corners or other confined spaces.

We claim:

1. An abrading tool comprising a flexible strip of hardenable and temperable steel having end portions each provided with holder-engaging means for mounting said strip under tension in a saw frame, and having, over at least a surface portion thereof, a strong, tough and adherent abrasive armoring coating produced in situ from abrasive particles of hard, high melting point, refractory metal-carbides, and particles of a high melting and tough brazing metal selected from the group consisting of cobalt-base and nickel-base alloys and combinations thereof, said brazing metal particles being fusion bonded to each other and to said steel strip and alloyed therewith into weldments individual to and partially embedding said abrasive particles, with said abrasive particles projecting from said weldments to form sharp cutting edges, and handle means comprising a sheath of elastomeric material surrounding and self-adhesively removably engaging at least one end portion of said strip to facilitate manual use as a filing device.

2. The abrading tool of claim 1 wherein said flexible strip comprises a file band.